(12) United States Patent
Metheny

(10) Patent No.: US 7,159,876 B2
(45) Date of Patent: Jan. 9, 2007

(54) VEHICULAR SNOW SKI STEERING KEEL BAR

(76) Inventor: Kevin Winfred Metheny, 820 Hillcrest Rd., West Lafayette, IN (US) 47906

( * ) Notice: Subject to any disclaimer, the term of this patent is extended or adjusted under 35 U.S.C. 154(b) by 178 days.

(21) Appl. No.: 10/675,613

(22) Filed: Sep. 30, 2003

(65) Prior Publication Data
US 2004/0061296 A1 Apr. 1, 2004

Related U.S. Application Data

(63) Continuation-in-part of application No. 09/922,009, filed on Aug. 3, 2001, now Pat. No. 6,631,912.

(51) Int. Cl.
*B62B 19/04* (2006.01)
(52) U.S. Cl. ............................................. 280/28
(58) Field of Classification Search .................. 280/28, 280/601, 602, 608, 609, 11.12, 11.18; 180/182
See application file for complete search history.

(56) References Cited

U.S. PATENT DOCUMENTS

| | | | | |
|---|---|---|---|---|
| 3,877,713 A * | 4/1975 | Mabie et al. | ................ | 280/28 |
| 4,077,639 A * | 3/1978 | Reedy | .......................... | 280/28 |
| 5,222,749 A * | 6/1993 | Bergstrom | ................... | 280/28 |
| 6,631,912 B1 * | 10/2003 | Metheny | ....................... | 280/28 |
| 2003/0034619 A1 * | 2/2003 | Bergstrom | ................... | 280/28 |
| 2004/0227312 A1 * | 11/2004 | Dick et al. | .................... | 280/28 |
| 2005/0017465 A1 * | 1/2005 | Bergstrom | ................... | 280/28 |

* cited by examiner

*Primary Examiner*—Jeff Restifo

(57) ABSTRACT

A vehicular snow ski steering keel bar is disclosed having a recessed surface portion extending at least partially along the length in the side surfaces of the bar. A lower side surface portion below the recessed surface portion includes lateral extensions extending beyond the recessed surface potion to collect and/or compact snow and/or material coming in contact with the steering keel bar. An upper side surface portion has lateral extensions that further direct snow into the recessed surface portion during turning and cornering of the bar. The cross-sectional shape of the bar includes a basic hourglass shape with curved and/or flat surfaces. Various cross-sectional shapes can be used along the length of the bar to fine-tune the turning characteristics of the steering keel bar. Different configurations or shapes can be utilized for the sides of the bar to vary the turning characteristics between left and right turns.

11 Claims, 16 Drawing Sheets

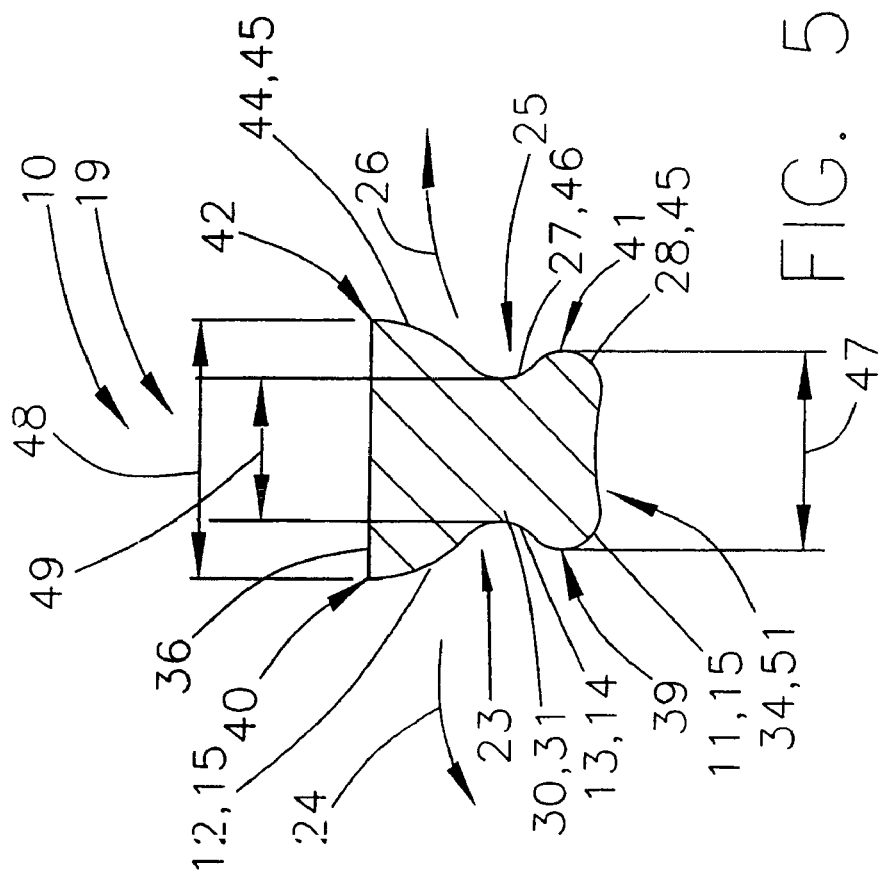
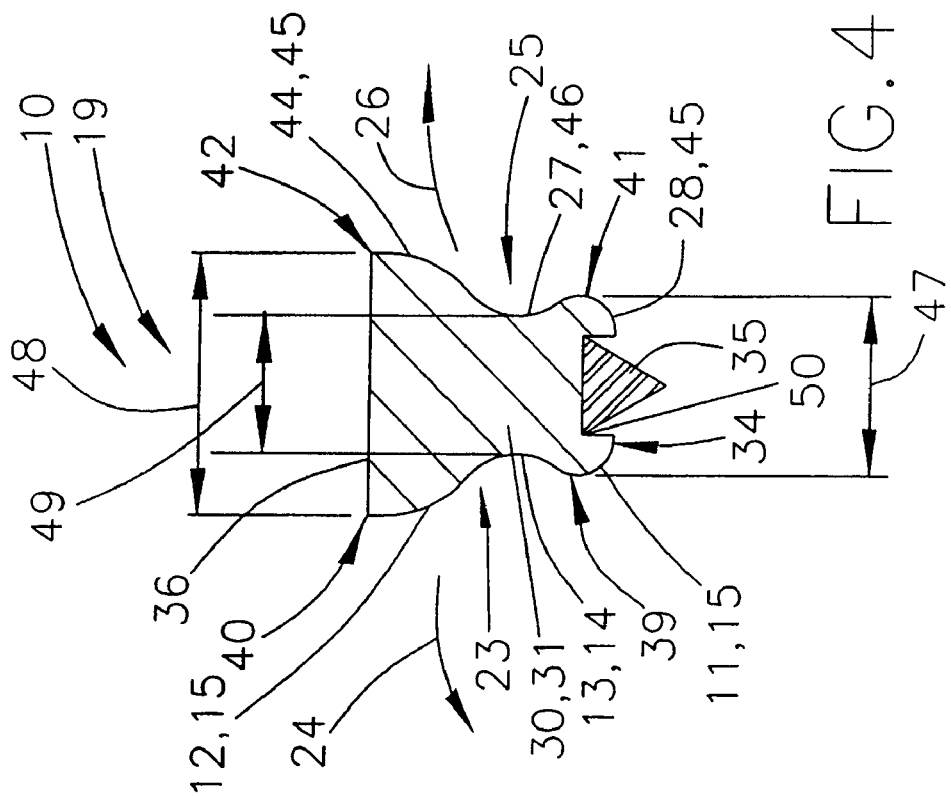

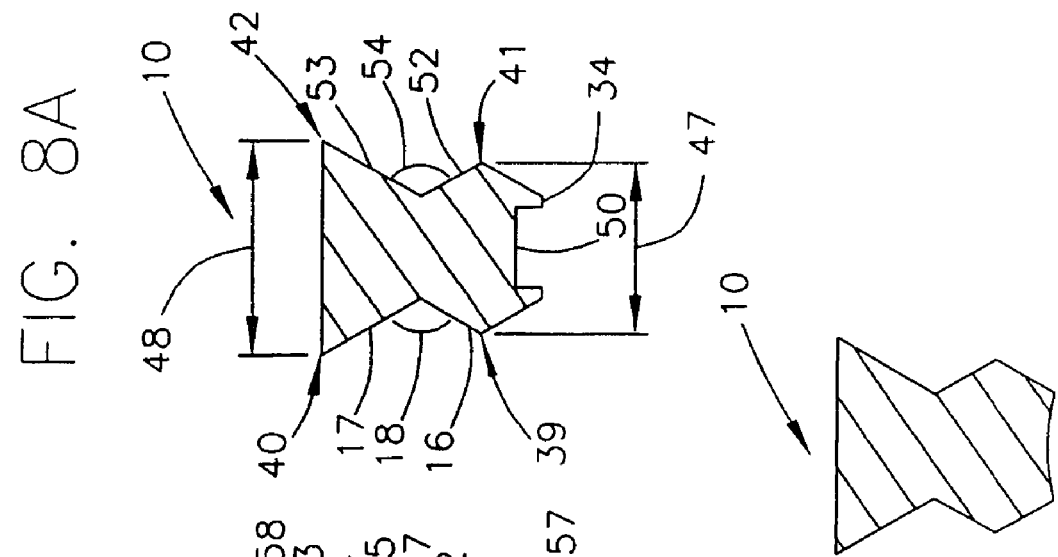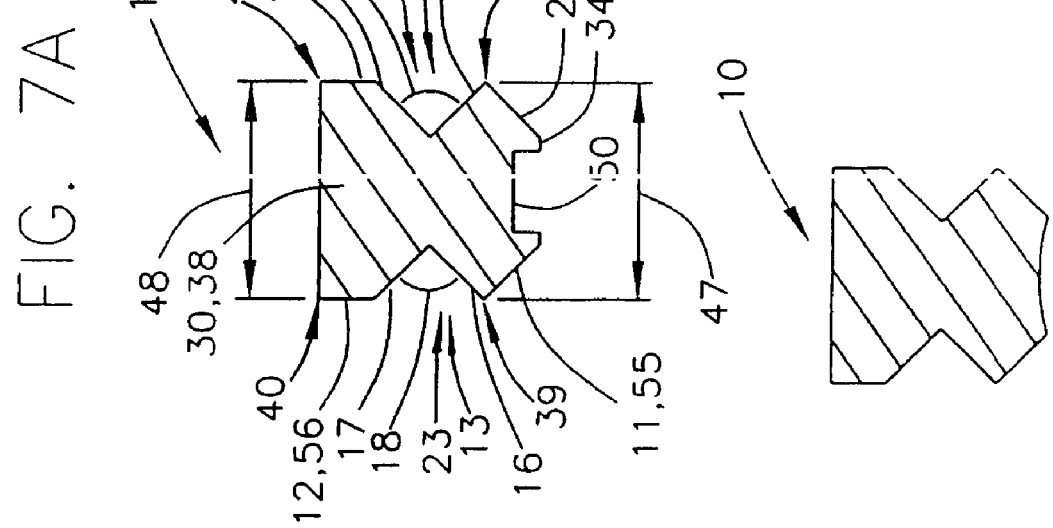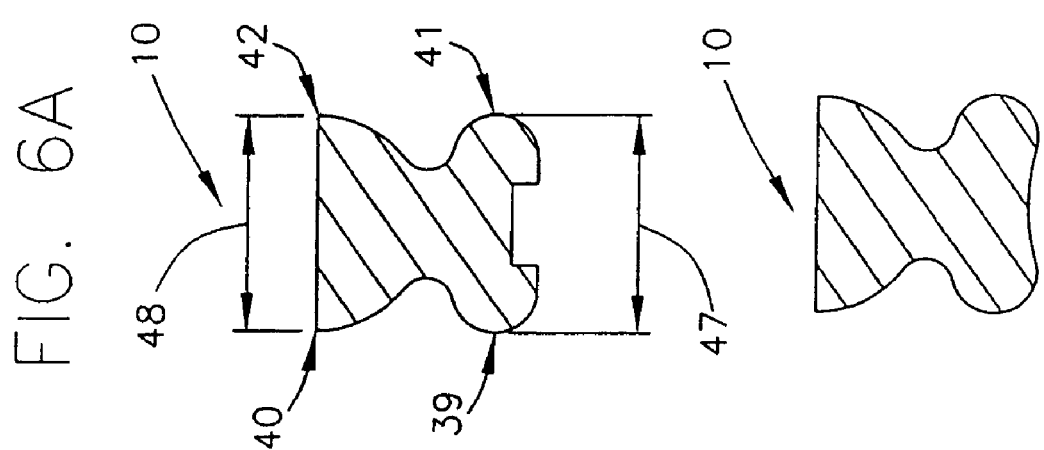

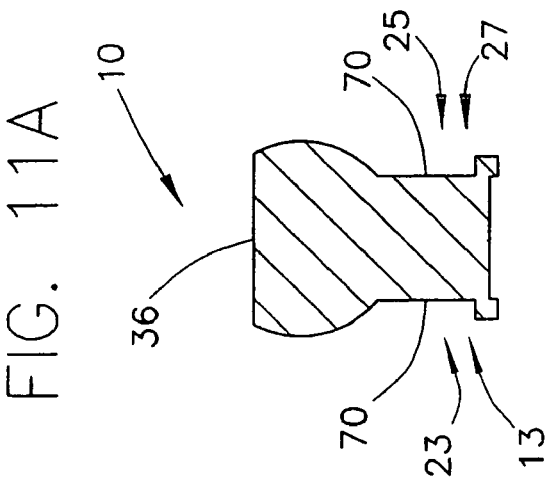
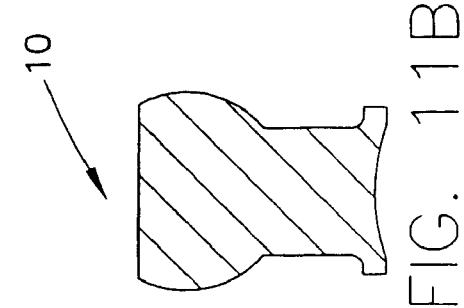
FIG. 11A
FIG. 11B
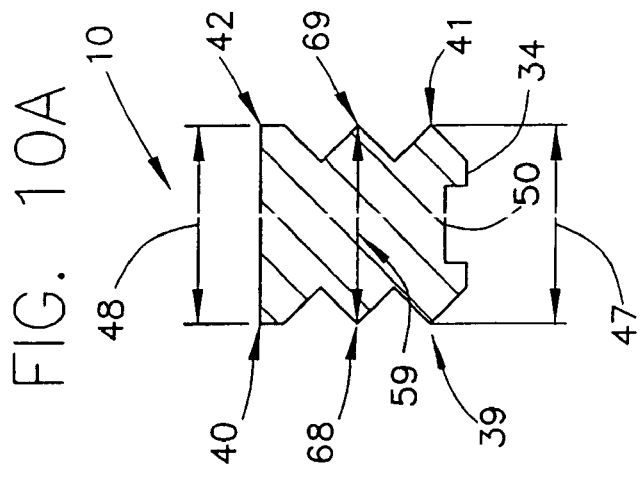
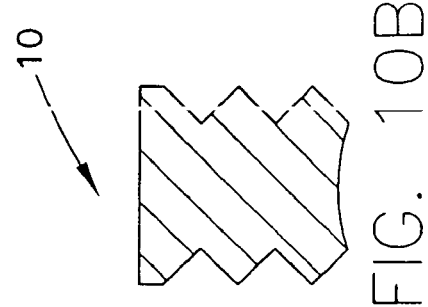
FIG. 10A
FIG. 10B
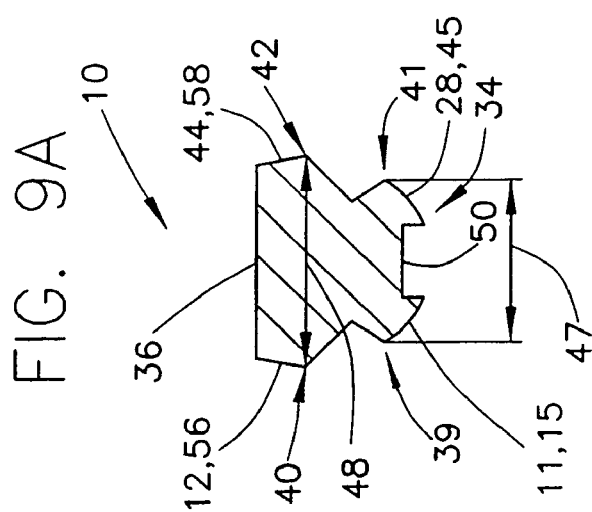
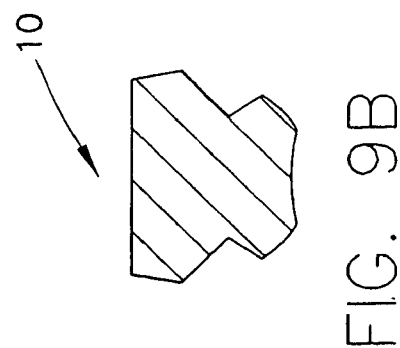
FIG. 9A
FIG. 9B

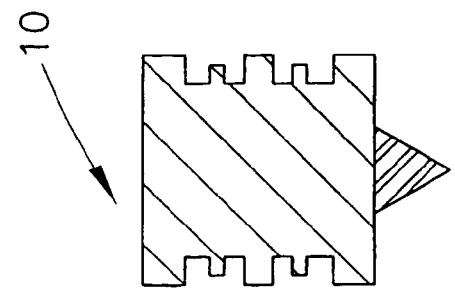
FIG. 16A  FIG. 16B  FIG. 16C
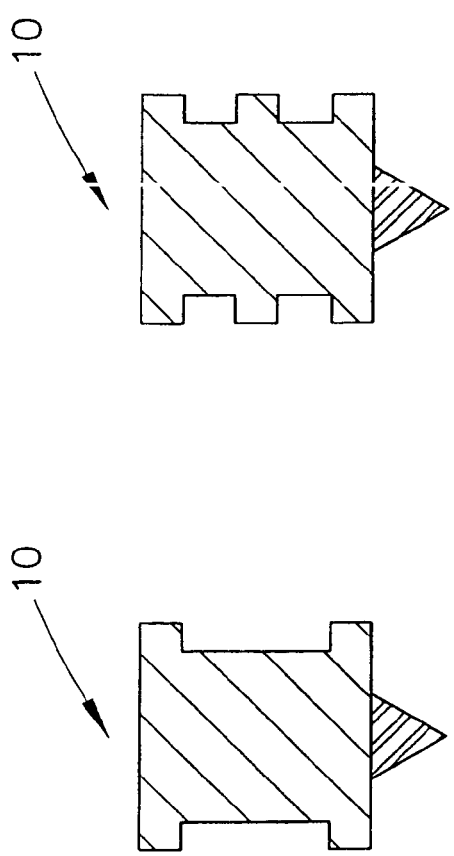
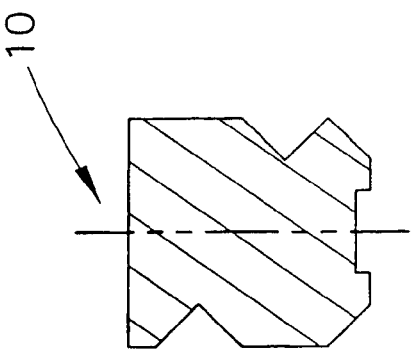
FIG. 17
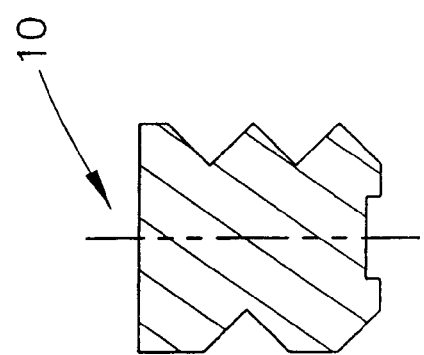
FIG. 18

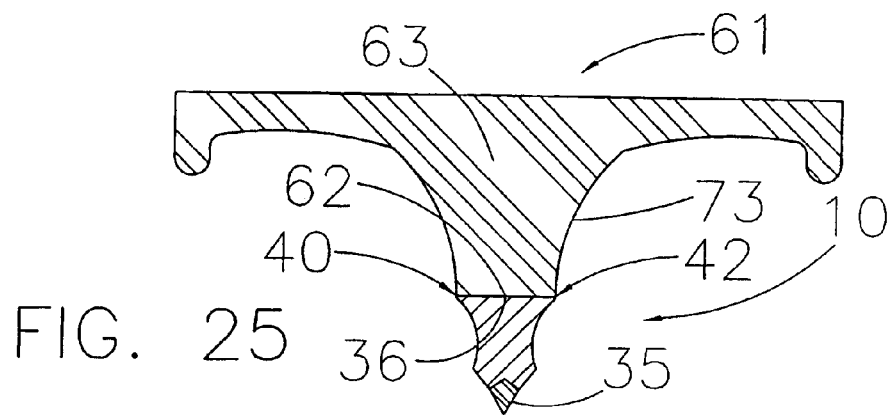
FIG. 25
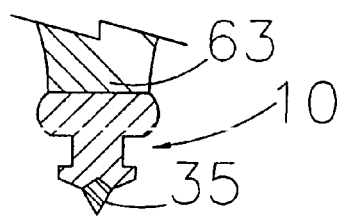
FIG. 26
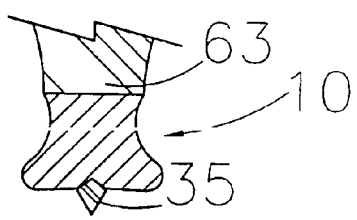
FIG. 27
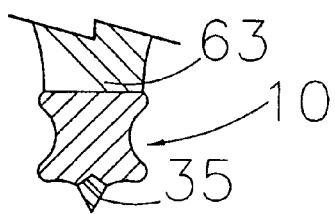
FIG. 28
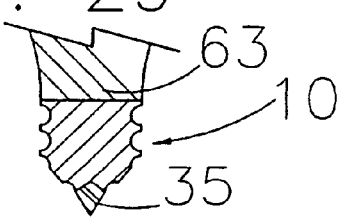
FIG. 29
FIG. 30

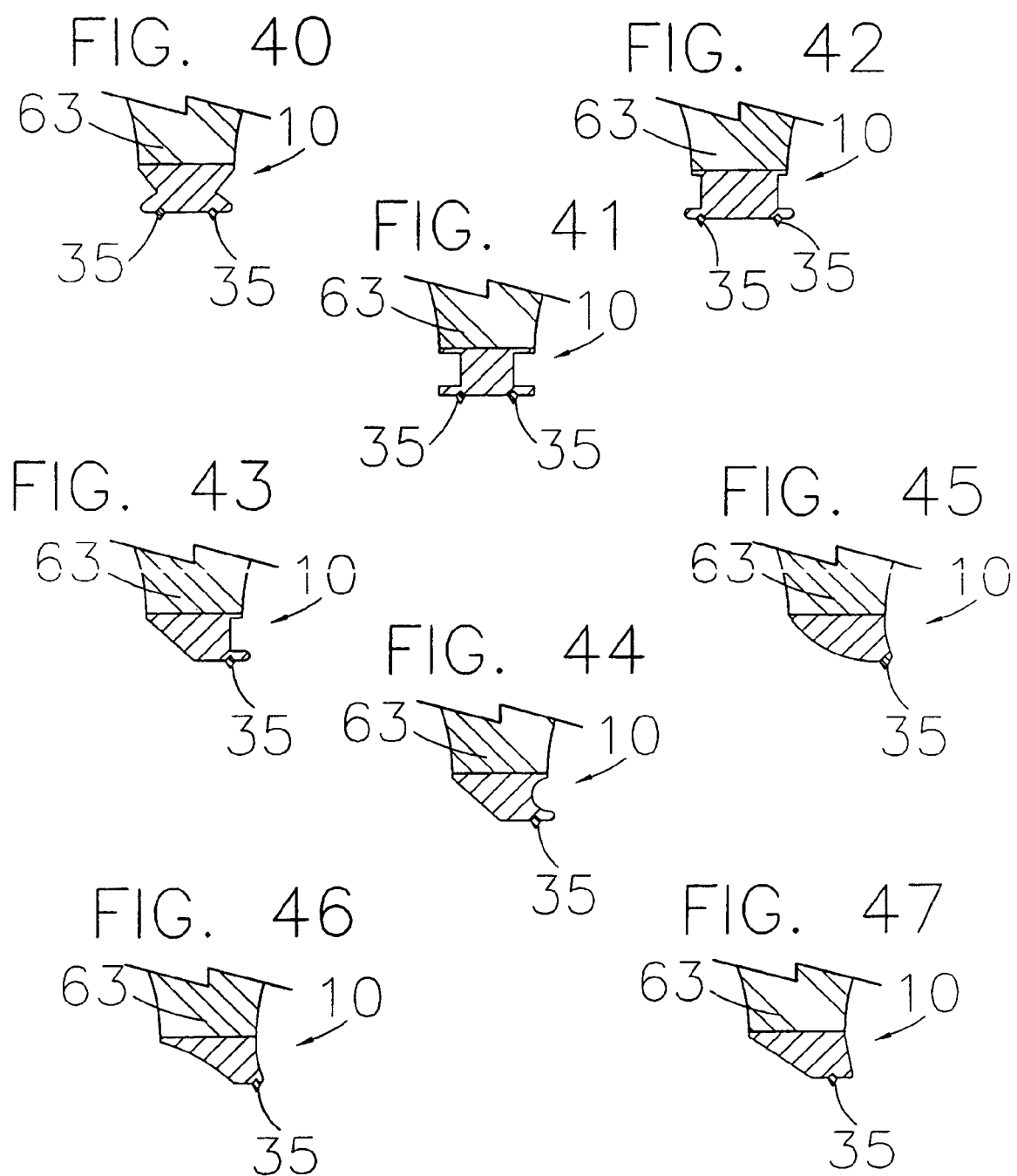

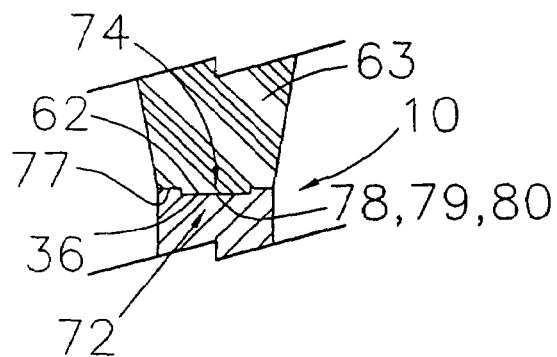
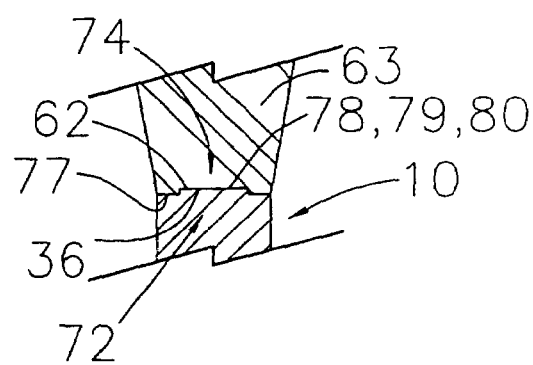
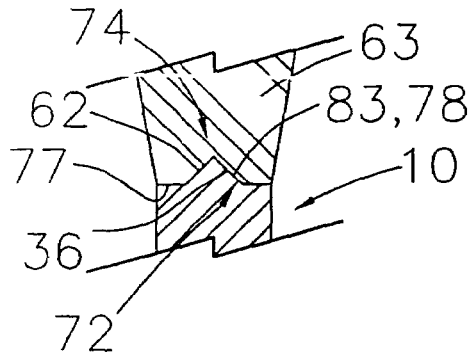
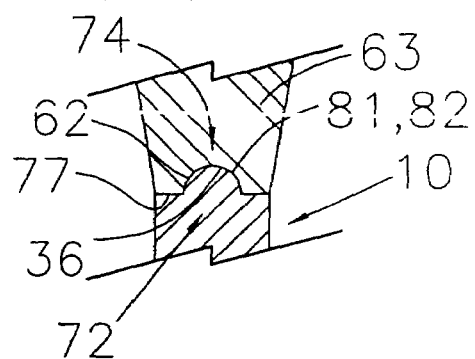
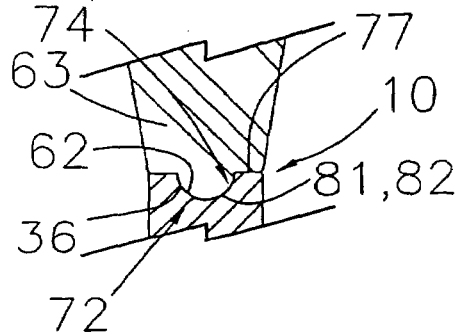
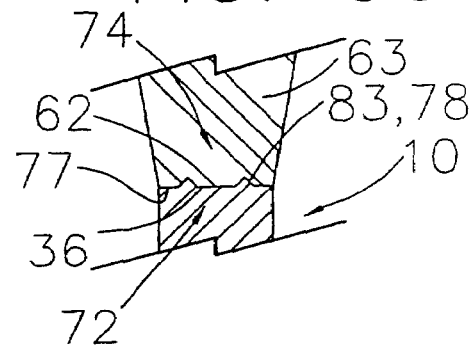

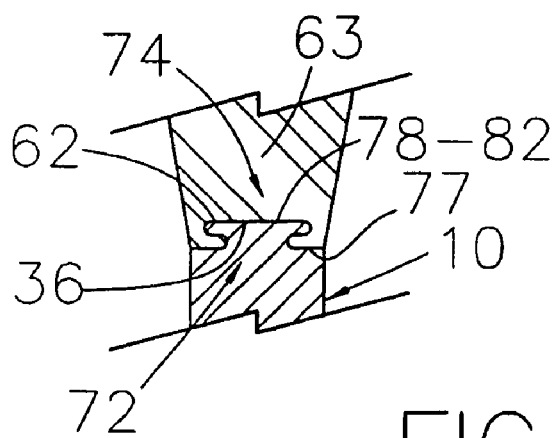
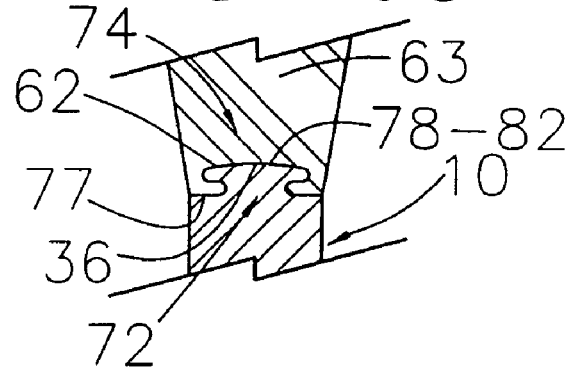
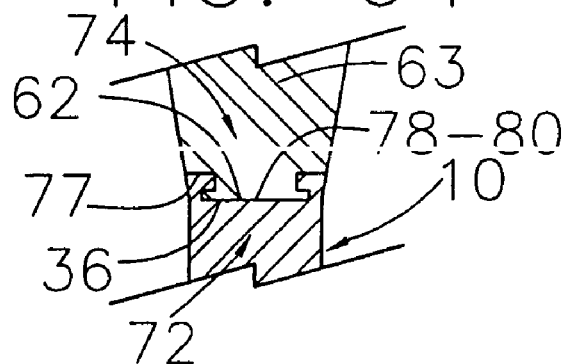
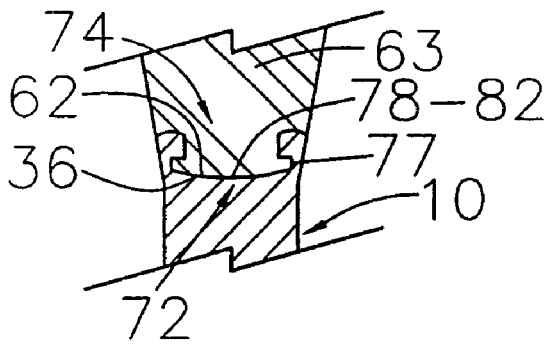
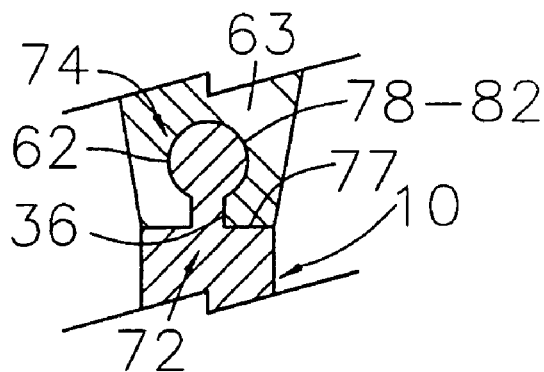

VEHICULAR SNOW SKI STEERING KEEL BAR

CROSS-REFERENCE TO RELATED DOCUMENTS

This application is a continuation-in-part of application Ser. No. 09/922,009, filed Aug. 3, 2001 now U.S. Pat. No. 6,631,912. Disclosure Document No 476155, filed Jun. 27, 2000.

TECHNICAL FIELD

This invention relates to vehicular snow skis and, in particular, to a steering keel bar that can be secured to the undersurface of a vehicular snow ski.

BACKGROUND OF THE INVENTION

Skis have been available for centuries for use on humans, sleighs, and various other snow vehicles including snowmobiles. Only until the last 50 years or so have these skis incorporated or included what have been referred to as wear or steering keel bars, runners, skags, and the like as depicted, for example, in U.S. Pat. No. 3,732,939 of Samson. The Samson runner blade is affixed to the bottom surface of a ski by three threaded studs with the front and rear ends of the bar bent so as to tuck into the bottom of the ski. This method of attachment is even popular today.

A wear, steering keel, or runner bar can perform several functions. As one name implies, a wear bar is used to lengthen the life of the under or bottom surface of the ski by focusing the contact or wear on the bar when in contact with the ground or hard surfaces. As a steering keel bar, the bar extends downwards, as in a watercraft, to stabilize and improve the steering responsiveness and capability of the ski.

The Samson patent also discloses the use of carbide chips or inserts that are affixed to the bottom of the bar to improve cornering or turning on ice or compacted snow. This is similar to ice skates having a cutting edge blade. In addition, the chips or inserts improve the wear characteristics of the bar as well as the ski.

The wear bar disclosed in the Samson patent, as well as many produced by manufacturers today, exhibits a circular cross-sectional shape with a notched longitudinal recess for affixing a chip or insert therein. The insert can be square or triangular bar stock for positioning in the wear bar recess. Wear bars also utilize inserts that have triangular or wedge-shaped configurations to further accentuate the pointed bottom edge of the bar presented to the ground, ice, or snow surface.

The problem with these round or wedge shaped wear bars is that the side of the bar directs snow or other material around or, more particularly, in a downward direction to escape causing the steering keel bar and ski to lose adhesion in a hard cornering situation. In extreme cases, dangerous loss of control can occur as the snow or other material causes the bar and ski to actually lift.

SUMMARY OF THE INVENTION

The foregoing problems and disadvantages are solved and a technical advantage is achieved in a preferred embodiment of an illustrative vehicular snow ski steering keel bar in which the side surface is shaped to catch, collect, and/or compact snow and/or other material coming in proximity or contact therewith to significantly improve steering control of the bar during turning and/or cornering. By collecting, directing and/or compacting the snow and/or other material, greater adhesion is achieved by the bar causing cornering control to improve dramatically. In an illustrative embodiment, the side surface of the bar includes first and second side surface portions that extend or project out to first and second lateral extensions of the bar, respectively. The side surface also advantageously includes a recessed surface portion that is disposed between and recessed in from each of the first and second lateral extensions to collect, direct and/or compact snow therein. This compacted snow advantageously provides additional lateral support to the steering keel bar during cornering to maintain stability and control of the bar. The bar also comprises a top surface that has a shape that at least partially mates and/or conforms with the shape of the undersurface of the snow ski keel. With the top surface of the bar mating or conforming to the undersurface of the keel, the bar can be shaped for compacting or directing snow independently of the keel or alternatively in direct cooperation with the cross-sectional shape of the keel to further fine tune and/or improve the handling and turning characteristics of the ski.

Unlike prior art bars, the steering keel bar of the present invention includes a side surface portion that extends laterally outward to a lateral extension that is below the recessed surface portion of the bar. This lateral extension of the bar further advantageously facilitates compacting of snow and/or other material in the recessed side portion and allows the compacted snow to exert a downward force on the steering keel bar, thus providing additional stability and control during turning and cornering. This is in direct contrast to prior art steering keel bars where the snow is simply directed downward and under the bar that results in the bar being pushed upwards to lessen and even lose control during hard turning and cornering.

Furthermore, the shape of the top surface of the bar has a width that matches the width of the undersurface of the ski keel to advantageously extend the profile of the keel and improve the compaction or direction of snow there against. The shape of the top surface can include at one or more of a flat, recess, notch, saw tooth, key, curve, radius, or ridge surface and/or any combination of these surfaces that at least mates with or conforms to the undersurface of the ski keel and thus, better interlock the keel and bar. This mating can also be used to extend the effective height and/or configuration of the ski keel.

The first and second side surface portions of the steering keel bar extend not only outward to lateral extensions, but also extend longitudinally at least partially along the bar. The recessed surface portion also extends longitudinally along the bar between and recessed in from the lateral extensions. The first and second side portions combine to form any one or a plurality of cross-sectional shapes for the steering keel bar. In one embodiment, the side surface portions are convex surface portions. The recessed surface portion includes a concave surface portion, and cooperates with the side surface portions to form an hourglass shape for the transverse, cross-sectional shape of the bar. In the preferred embodiment, the side or lateral surfaces of the bar are mirror images of each other, thus forming the cross-sectional hourglass shape. The width between the lateral extensions of the upper and lower side surface portions of the lateral side surfaces can be the same or different widths to accommodate different control features for the bar. More aggressive steering control can be advantageously achieved as the width of the lower side surface portion extensions are increased with respect to the waist section of the hourglass shape and/or the width of the upper side surface portion extensions.

The cross-sectional shape of the steering keel bar can also advantageously vary longitudinally along the bar. The width or extent of the extensions can vary to provide more or less aggressive steering control to the front end portion of the bar relative to the intermediate and rear end portions of the bar. The variance in the cross-sectional shape of the bar can be advantageously used to correct or fine tune the under steer and/or over steer properties of the bar, as well as the ski and vehicle to which it is normally attached. The side surface portions of the first and second sides are commonly mirror images, but can be also of different configurations or vertically offset from one another.

In another preferred embodiment, the recessed surface portion of a side surface can be flat adjacent surfaces with a predetermined angle therebetween. The angle can advantageously be altered to alter the flow of material in the recessed surface portion from a laminar to a turbulent flow, thus also affecting the compacting of the snow. Sharper angles create greater turbulent flow, whereas the smooth or rounded side surface portions provide cleaner or laminar flow, thus providing greater snow compaction. These flat surfaces can be utilized to form a saw tooth or zigzag, cross-sectional shape for the bar.

To improve the wear and/or steering control properties of the steering keel bar, inserts of usually a harder material than that of the bar are affixed to the bottom surface of the steering keel bar. Any of the cross-sectional shapes of the bar can be configured with or without the inserts. Advantageously, the inserts can be disposed along the length of the bar and in combination with various cross-sectional shapes to alter or fine tune the overall steering control of the bar. The first and second sides can also have different side surface portion shapes, but are commonly mirror images of each other. In addition, multiple inserts can be positioned laterally one another to improve lateral handling or to provide different handling when turning left or right.

Threaded studs are advantageously affixed to the top surface of the steering keel bar to attach the bar to the keel or undersurface of a vehicle ski such as, for example, a snowmobile ski.

BRIEF DESCRIPTION OF THE DRAWING

FIGS. 4 and 5 depict alternative and enlarged, transverse, cross-sectional views of the steering keel bar of FIG. 3 along the lines 4—4; 5—5; and 6—6;

FIGS. 6A through 18 depict alternative and enlarged, cross-sectional views of the steering keel bar of FIG. 3 along the lines 4—4; 5—5; and 6—6;

FIG. 25 depicts a cross-sectional view of another alternative embodiment of the steering keel bar of the present invention attached to a snowmobile ski;

FIGS. 26 through 47 depict partial, cross-sectional views of alternative embodiments of the steering keel bar of FIG. 25 with the recessed and/or curved side surface of the keel bar cooperating with the lateral surface of the vehicular snow ski keel to improve the compacting or directing of snow coming in contact therewith;

FIGS. 50 through 66 depict partial, cross-sectional views of alternative embodiments of the steering keel bar of FIGS. 3, 19 and 25 with the shape of the top surface including at least one of a flat, recess, notch, saw tooth, key, curve, radius, ridge surface and/or any combination thereof that at least partially mates and/or interlocks with the undersurface of a vehicular snow ski keel.

DETAILED DESCRIPTION

Figures 1, 2:
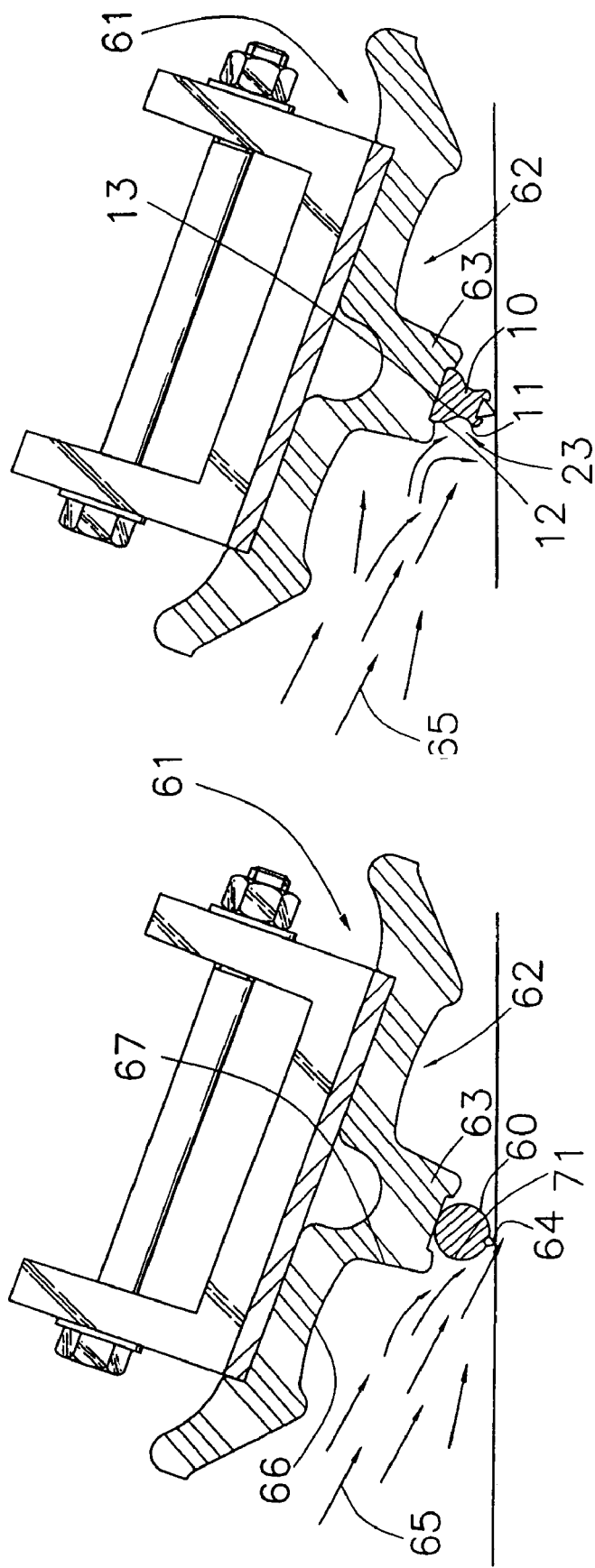
FIG. 1 depicts a cross-sectional view of an illustrative prior art wear bar attached to a snowmobile ski.
FIG. 2 depicts a cross-sectional view of the steering keel bar of the present invention attached to a snowmobile ski.

Depicted in FIG. 1 is a cross-sectional view of an illustrative, prior art wear bar 60 attached to undersurface 62 of snowmobile ski 61 and, in particular, keel 63 of the ski. Wear bar 60 has a well-known circular cross-sectional shape and is attached to ski 61 using, for example, well-known threaded studs that are welded to the top surface of the wear bar. Wear bar 60 includes triangular shaped, carbide insert 64 that is attached to the bottom surface of the bar for making contact with the ground. Ski 61 is depicted traveling in a direction coming out of the page and making a left turn. As a result of the snowmobile's front suspension, ski 61 is tilted to one side (left side relative to ski), and snow depicted by arrows 65 on the other side (right side) is accumulating and being pushed down to and under the bottom surface of wear bar 60. Concave and flat undersurface portions 66 and 67 of the ski collect and compact snow coming in contact therewith as disclosed in U.S. Pat. Nos. 5,040,818 and 5,145,201 of the present inventor and incorporated by reference herein. However, prior art circular wear bar 60 only exhibits a convex surface 71 that directs and pushes snow 65 in a downward direction. Since circular or wedge shaped bars cannot capture snow coming in from the sides, snow 65 or any base material will flow around and under the bar, thus escaping and causing the wear bar and ski to lose adhesion in a hard cornering situation with a dangerous loss of control in extreme instances.

Depicted in FIG. 2 is a cross-sectional view of a preferred embodiment of illustrative steering keel bar 10 of the present invention that is attached to undersurface 62 and keel 63 of snowmobile ski 61. This ski is oriented as in FIG. 1; however snow as depicted by arrows 65 is being directed into recessed surface portion 13 of the steering keel bar and being compacted therein. First or lower side surface portion 11 of first or lateral side surface 23 of the steering keel bar directs the snow into recessed surface portion 13. This compacted snow provides additional lateral support for the steering keel bar to push laterally against, thereby providing additional steering stability and control for the bar as well as the ski and snowmobile. In addition, snow is no longer being pushed under the bar to provide lift as in circular cross-sectional, prior art designs. Rather, the compacted snow now has a downward component that pushes down on recessed surface portion 13 and first or lower side surface portion 11 of the steering keel bar.

Figure 3:
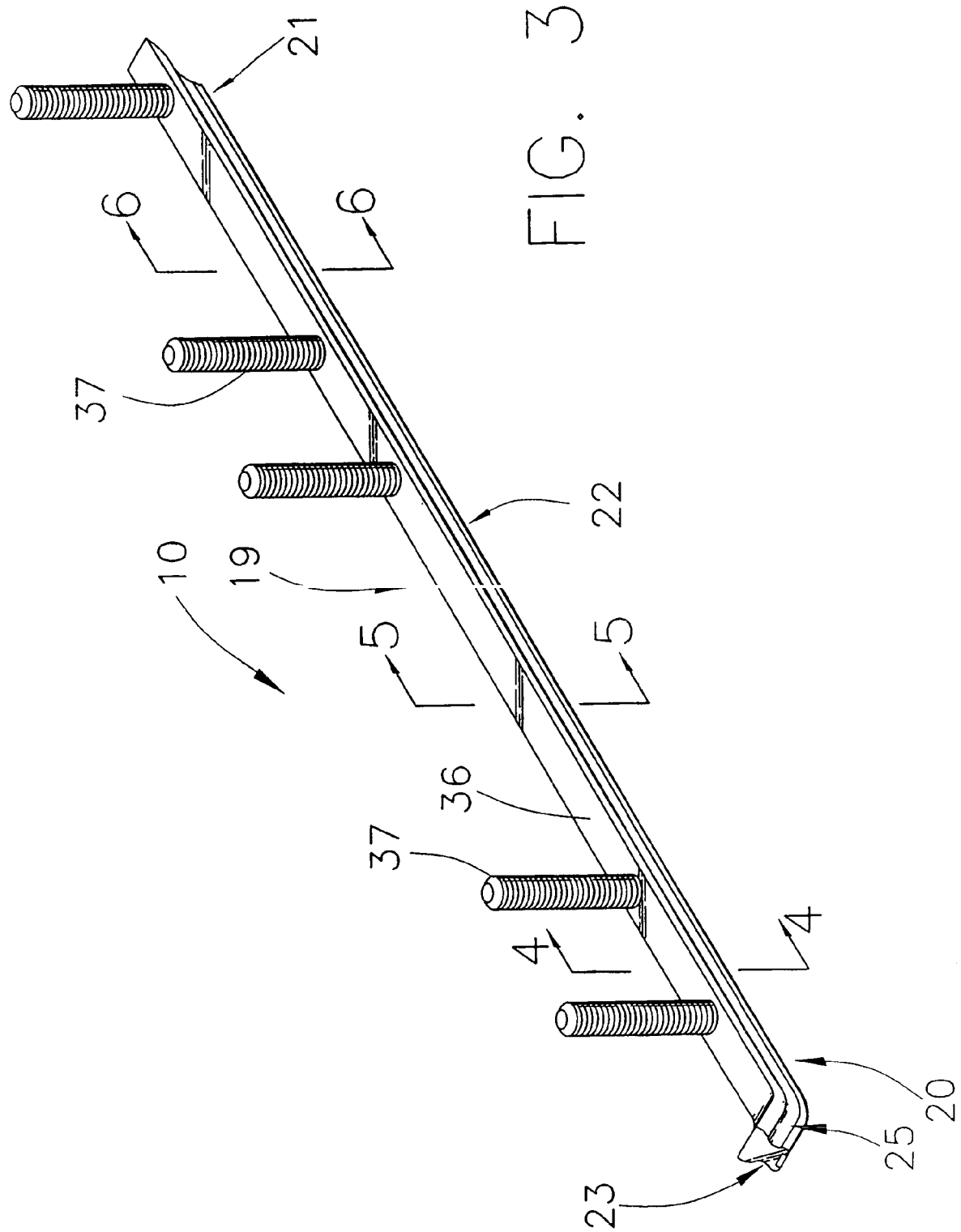
FIG. 3 depicts a pictorial view of the steering keel bar of the present invention.

FIG. 3 depicts a pictorial view of a preferred embodiment of illustrative steering keel bar 10 of the present invention. The bar comprises an elongated member 19 of a suitable material such as steel, stainless steel, aluminum or any other metal that can be readily manufactured and shaped into the various cross-sectional shapes that will be described hereinafter. Various commercially available polymers are suitable such as ultra or very high molecular weight polyethylene material. The bar or elongated member has a front end portion 20, a back end portion 21, and an intermediate portion 22 extending longitudinally between the front and back end portions. Attached to top surface 36 of the steering keel bar or elongated member is a plurality of threaded rods or studs 37 that affix the bar or member to the bottom or undersurface of a snowmobile or other vehicle ski. The front end portion as well as the rear end portion of the bar can be bent or curved up for insertion into slots or apertures in the bottom surface of the ski to better conform to the longitudinal shape of the ski. This eliminates any flat surfaces which impede the travel of the bar, ski, and vehicle.

The intermediate portion 22 of the bar includes first (right) and second (left) side surfaces 23 and 25 that extend at least partially, if not entirely, and longitudinally thereal-ong. These side surfaces extend to the front and back end portions as well, but not always in the same cross-sectional shape configuration. As suggested, the cross-sectional shape of the bar or member can vary along the length of the bar so as to fine tune or alter the steering properties of the bar, ski, and/or vehicle.

FIGS. 4 and 5 depict alternative and enlarged, transverse cross-sectional views of steering keel bar 10 or elongated member 19 of FIG. 3 along the lines 4—4; 5—5; and 6—6. First side surface 23 faces in an at least first lateral direction 24 from the bar, and second side surface 25 faces in an at least second lateral direction 26 from the bar generally opposite to at least first lateral direction 24. First side surface 23 includes first or lower side surface portion 11 and second or upper side surface portion 12 that extend out to first (lower) and second (upper) lateral extensions 39 and 40, respectively. First side surface 23 also includes recessed surface portion 13 that is disposed between and recessed in from each of first and second lateral extensions 39 and 40. In this preferred embodiment, first and second side surface portions each comprise a convex side surface portion 15, whereas recessed side surface portion 13 comprises a concave side surface portion 14. As previously suggested, lower side surface portion 11 and recessed surface portion 13 cooperate for at least collecting, directing and/or compacting snow and/or any other material coming in proximity thereto or in contact therewith. Upper side surface portion 12 also directs and helps compact snow in recessed surface portion 13.

Second side surface 25 is similar to first side surface 23 but for turning the bar, ski, and vehicle in an opposite direction. As depicted and oriented, first side surface 23 would be used for a left hand turn, whereas second side surface 25 would be used for a right hand turn. This would be the case regardless of whether the ski was on the left or right side of, for example, the snowmobile. Second side surface 25 includes recessed surface portion 27 that extends longitudinally and at least partially along the steering keel bar. Second side surface 25 also includes a first or lower side surface portion 28 adjacent to and below recessed surface portion 27. Lower side surface portion 28 extends outward in at least second lateral direction 26 to first or lower lateral extension 41. The second side surface 25 further includes second or upper side surface portion 44 that is adjacent recessed surface portion 27 and extends outward to second or upper lateral extension 42. In this embodiment again, lower and upper side surface portions 28 and 44 are convex surface portions 45, and recessed surface portion 27 is a concave surface portion 46.

The transverse cross-sectional views of steering keel bar 10 of FIGS. 4 and 5 also illustrate transverse cross-sectional shape 30 of intermediate portion 22 of the bar. This cross-sectional shape or any other cross-sectional shape can be used in the front and rear end portions as indicated by lines 4—4 and 6—6 in FIG. 3. This cross-sectional shape 30 can be said to have what is commonly referred to as a well-known hourglass shape 31. In this preferred embodiment, the hourglass shape has a first (lower) width or distance 47 between first (lower) lateral extensions 39 and 41 and a second (upper) width or distance 48 between second (upper) lateral extensions 40 and 42. Minimum width or waist distance 49 extends between recessed surface portions 13 and 27.

In this preferred hourglass shape, the first width or distance 47 between the lower lateral extensions 39 and 41 is approximately 0.340 inches and less than the second width or distance 48 being approximately 0.500 inches. Waist width or distance 49 between recessed surface portions is approximately 0.312 inches. The overall height of the steering keel bar in this embodiment is approximately 0.462 inches. Convex lower side surface portions 11 and 28 have a radius of curvature of approximately 0.060 inches, whereas convex upper side surface portions 12 and 44 have a radius of curvature approximately 0.203 inches. Concave recessed surface portions 13 and 27 have a radius of curvature of approximately 0.125 inches.

In FIGS. 4 and 5, top surface 36 of the steering keel bar has fasteners 37 (not shown) such as threaded studs or rods attached in a well-known manner and extending upwards for attaching the bar to a snow ski. Bottom surface 34 of the bar can take several configurations: normally one configuration for attaching a carbide insert 35 thereto and another configuration for running without the insert. In FIG. 4, the bottom surface includes a square shoulder recess 50 formed therein to receive carbide insert 35. This is usually further affixed by using silver solder. In FIG. 5, the bottom surface includes another concave surface portion 51 with, for example, a radius of curvature of approximately 0.500 inches.

In the non-insert configuration or alternate embodiment of the steering keel bar depicted in FIG. 5, the various widths and radii of curvature are modified to accommodate the bar running directly on the bottom surface of the bar rather than on the insert 35 in FIG. 4. Lower convex side surface portions 11 and 28 have a radius of 0.075 inches, upper convex side surface portions 12 and 44 have a radius of 0.250 inches, and concave recessed surface portions 13 and 27 have a radius of 0.085 inches. The waist is approximately 0.275 inches, and the lower hip or extension width is approximately 0.3826 inches.

FIGS. 6A through 18 depict cross-sectional views of alternative preferred embodiments of the cross-sectional shape of the basic embodiments of the steering keel bar 10 depicted in FIGS. 4 and 5. These alternative cross-sectional shapes can be used entirely or partially along the bar either solely or in combination with any other cross-sectional shape. FIG. 6A depicts a cross-sectional view of steering keel bar 10 of FIG. 4 with provisions for a carbide insert in which first width 47 between lower lateral extensions 39 and 41 is equal to second width 48 between upper lateral extensions 40 and 42. FIG. 6B depicts a similar cross-sectional view of bar 10 without any provision for a carbide insert. FIG. 15A depicts a cross-sectional view of steering keel bar 10 of FIG. 4 in which first width 47 between lower lateral extensions 39 and 41 is greater than second width 48 between upper lateral extensions 40 and 42. FIG. 15B depicts a similar cross-sectional view of bar 10 without any provision for a carbide insert. FIG. 15C depicts another similar cross-sectional view of bar 10 with two inserts 35 attached to bottom surface 36. These alternative cross-sectional shapes of the steering keel bar represent greater compacting of snow in the recessed surface portions of the side surfaces. However, as the width between the lower lateral extensions increases, the maximum tilt or yaw of the bar with an insert decreases. As a result, any insert must be further extended from the bottom surface of the steering keel bar to maintain contact with the ground surface.

Figure 14A:
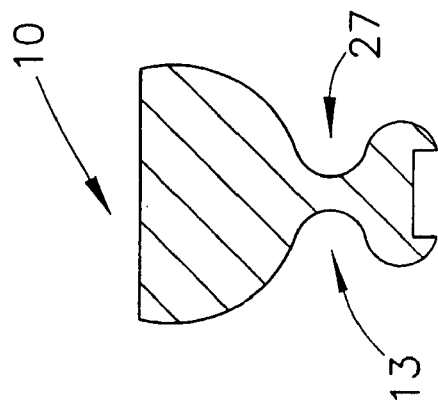
Figure 14B:
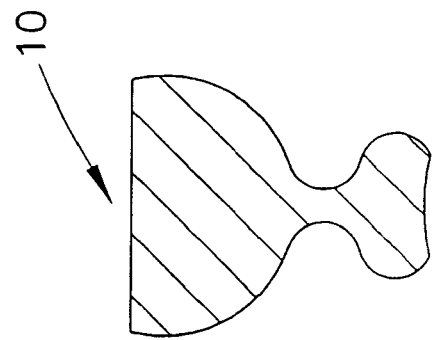
Figure 13:
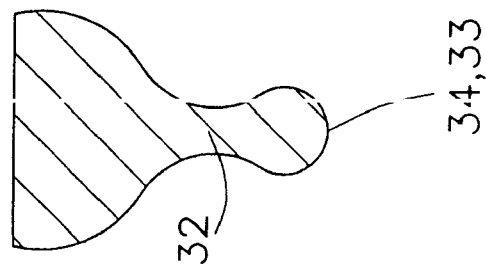
Figure 15C:
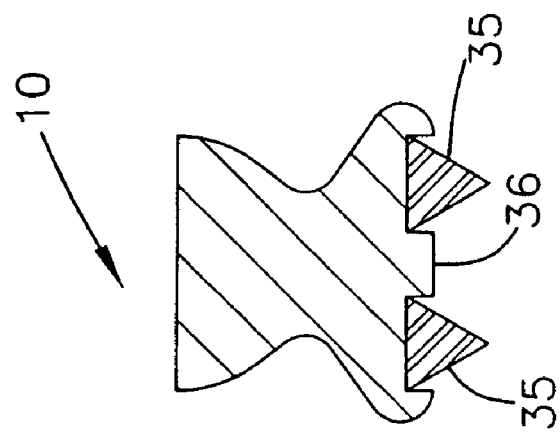
Figure 15B:
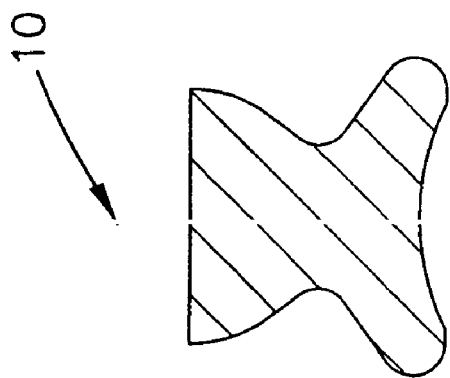
Figure 15A:
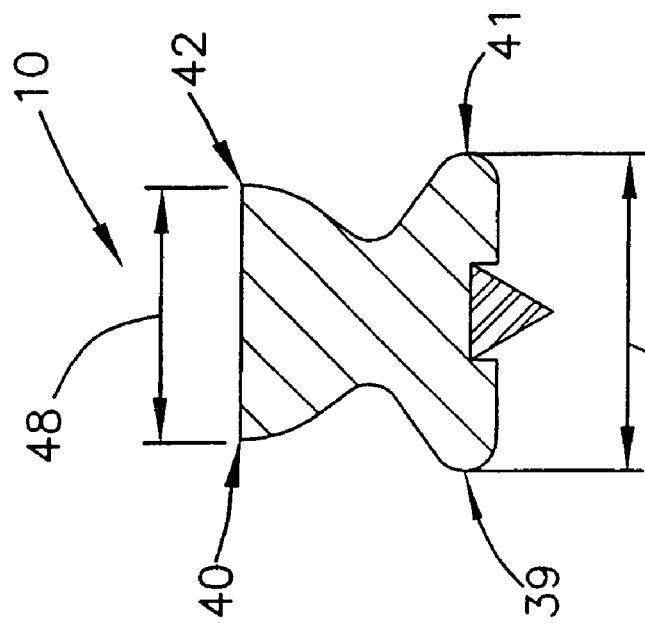

FIGS. 13 and 14A and B depict cross-sectional views of still other preferred embodiments of steering keel bar 10 of FIGS. 5 and 4, respectively. In FIGS. 14A and B, the recessed surface portions 13 and 27 are deeper than those of FIG. 4, thus allowing for denser snow compaction. In FIG. 13, the non-insert version of steering keel bar 10 has a thinner waist section 32 than that of FIG. 5. The bottom surface 34 is a concave surface portion 33. This hourglass shape has essentially one ground point on the bottom surface rather than the two depicted in FIG. 5.

FIGS. 7A through 10A depict cross-sectional views of yet other preferred embodiments of steering keel bar 10 of FIG. 4. All of these embodiments are depicted with a square shoulder recess 50 in bottom surface 34 for positioning and affixing a carbide insert therein. These embodiments can be designed without the insert recess such that steering keel bar 10 runs or rides on the bottom surface thereof as depicted in FIGS. 7B through 10B. In FIG. 7A, the first and second side surfaces 23 and 25 include a plurality of flat surfaces that give transverse cross-sectional shape 30 a saw tooth shape 38. In particular, recessed surface portion 13 of first side surface 23 includes first and second flat surfaces 16 and 17 with predetermined angle 18 therebetween, whereas recessed surface portion 27 of second side surface 25 includes first and second flat surfaces 52 and 53 with predetermined angle 54 therebetween. In this embodiment, the width 47 between lower lateral extensions 39 and 41 is equal to width 48 between upper lateral extensions 40 and 42. First and second side surface portions 11 and 12 of first side surface 23 include first and second flat surfaces 55 and 56, respectively; whereas first and second side surface portions 28 and 44 of second side surface 25 flat surfaces 57 and 58, respectively.

FIG. 10A depicts a cross-sectional view of another preferred embodiment of the steering keel bar 10 of FIG. 7A. In this embodiment the widths or distances 47 and 48 between the lower and upper lateral extensions remain equal in length as in the embodiment of FIG. 7A; however, another pair of lateral extensions 68 and 69 with width or distance 59 therebetween is positioned between the upper and lower lateral extensions 40, 42 and 39, 41. Width or distance 59 is the same as widths 47 and 48. As a result, a double saw tooth shape is formed, thereby increasing the surface area in which snow can be compacted.

FIG. 8A depicts a cross-sectional view of yet another preferred embodiment of the steering keel bar 10 of FIG. 7A. In this saw tooth cross-sectional shape embodiment, angles 18 and 54 between flat surface pairs 16, 17 and 52, 53 have been increased along with width or distance 47 between lower lateral extensions 39 and 41 being made less than the width or distance 48 between upper lateral extensions 40 and 42.

FIG. 9A depicts a cross-sectional view of still another preferred embodiment of the steering keel bar 10 of FIGS. 7A and 8A. This embodiment includes several design changes to the combination of the bars depicted in FIGS. 7A and 8A. In this cross-sectional shape, width 48 between upper lateral extensions 40 and 42 is greater than width 47 between lower lateral extensions 39 and 41. In addition, upper lateral extensions 40 and 42 have been moved down from top surface 36. Upper side surface portions 12 and 44 include respective flat surfaces 56 and 58 that form an angle greater than 90 degrees with top surface 36, thus moving the upper lateral extensions downward. Lower side surface portions 11 and 28 include respective convex surface portions 15 and 45.

Figure 12A:
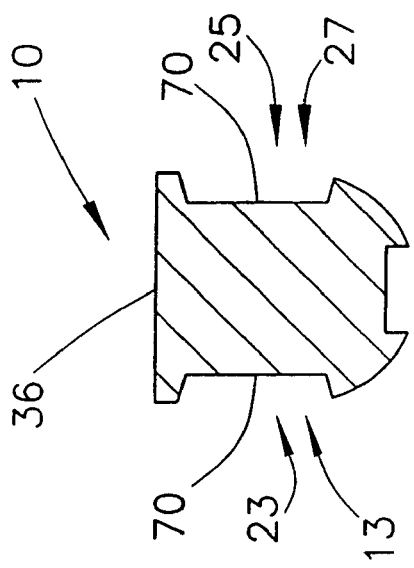
Figure 12B:
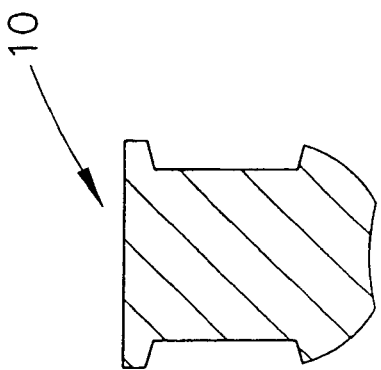

FIGS. 11A–B and 12A–B depict cross-sectional views of still yet other embodiments of the steering keel bar 10 of the present invention. FIGS. 11A and 12A are the insert versions of bar 10, and FIGS. 11B and 12B are the non-insert versions. Right and left side surfaces 23 and 25 each include a flat surface 70 that is approximately 90 degrees with respect to top surface 36. These flat surfaces 70 are the main section of recessed surface portions 13 and 27. The lower and upper side surface portions include a combination of flat and concave surfaces as shown. These embodiments as well as all the other embodiments include variations on the basic hourglass or saw tooth cross-sectional shape to fine tune the turning capability of the bar and vary snow compaction in the recessed surface portions. Increasing the surface area of the sides advantageously enhances the hourglass or saw tooth cross-sectional shape of the steering keel bar. Not all of these embodiments have been field tested, but are within the spirit and scope of the claimed invention and that other variations of the basic cross-sectional shape are also contemplated.

FIGS. 16A, B and C depict cross-sectional views of yet other alternative embodiments of steering keel bar 10 of the present invention. In FIG. 16A, steering bar 10 has one square shoulder recessed surface portion per side. To increase the side surface area, FIG. 16B depicts steering keel bar 10 with two square shoulder recessed surface portions per side. To further increase side surface area, FIG. 16C depicts steering keel bar 10 with four square shoulder recessed surface portions per side. All of these embodiments include a flat bottom surface with an insert simply attached thereto using, for example, silver solder or expoxy glue.

FIG. 17 depicts a cross-sectional view of still yet another alternative embodiment of steering keel bar 10 with a different recessed surface portion on each side.

FIG. 18 depicts a cross-sectional view of yet still another alternative embodiment of steering keel bar 10 with the same recessed surface portion on each side, but vertically offset from each other.

To substantiate the advantages of the steering keel bar of the present invention versus round steel wear bars with no carbide inserts and round steel wear bars with 10 inches of 60 degree carbide inserts, tests were performed with all three bars mounted on the bottom of snowmobile skis, Model VX-301 Lightning Skis of Ultimate Sports, Inc. of Lafayette, Ind., affixed to a 2000 Ski-Doo 700 MXZ Millennium Edition snowmobile. The tests were performed in Eagle River, Wis., on Feb 6, 2001, on 6 to 8 inches of fresh snow over 3 to 4 inches of hard packed snow. The snow was of good density, not loose, and without a firm crust on top. The hard packed snow below was firm, but not icy. Temperature ranged from 6 to 15 degrees Fahrenheit from 9:30 am to 1:00 pm.

During all the tests, the test snowmobile started from a dead stop with the handlebars in the straight-ahead position. As the snowmobile reached the required 5-10-15 miles per hour speeds, the handlebars were turned to a full left hand turn lock position and held there until one complete circle was accomplished. A measurement for diameter was taken with a standard tape measure from the center of the inside ski path to the center of the inside ski path directly across the circle. All tests were repeated three times and an average recorded. The following are our results.

Test 1 Steel Wear Bars with 10" of 60 Deg. Carbide
5 mph=20 ft. diameter
10 mph=28 ft. diameter
15 mph=No data recorded. A tight circle could not be held at speed
Test 2 Steel Wear Bars with No Carbide Inserts
5 mph=21 ft. diameter
10 mph=30 ft. diameter
15 mph=No data recorded. A tight circle could not be held at speed.
Test 3 USI Steering Keel Bars with No Carbide Inserts 111 (FIG. 5)
5 mph=18 ft. diameter
10 mph=24 ft. diameter
15 mph=No data recorded. A tight circle could not be held at speed.
No significant steering effort was incurred over the round shape of the no carbide wear bar or the 10 in. 60 deg. wear bar.

Test Results

| Radius comparison: | 5 mph | 10 mph | 15 mph |
| --- | --- | --- | --- |
| 10" Carbide Wear Bar | 10 ft. | 14 ft. | No Data |
| No Carbide Wear Bar | 10.5 ft. | 15 ft. | No Data |
| USI Steering Bar | 9 ft. | 12 ft. | No Data |

Test Summary

The above tests conclude that the new USI steering keel bar of the present invention, because of their unique new shape, aid significantly in reducing the turning diameter of a snowmobile without increasing steering effort in snow. By catching and conducting snow down the length of the wear bar in addition to bottom bar adhesion to the surface being traversed, the new design steering bar will make steering more positive and safer for the operator.

Figure 19:
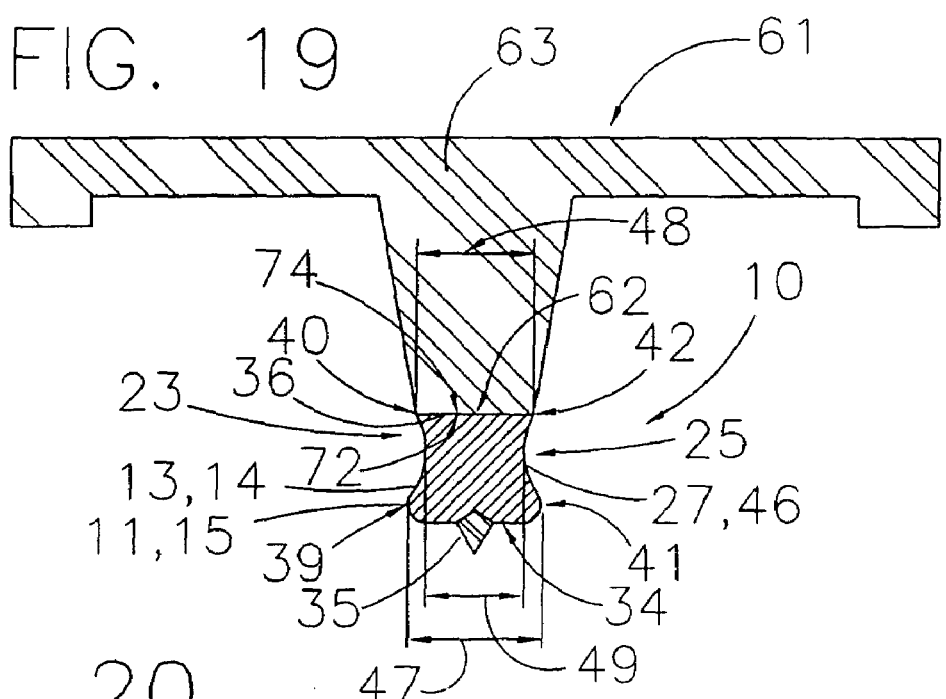
FIG. 19 depicts a cross-sectional view of an alternative embodiment of the steering keel bar of the present invention attached to a snowmobile ski.
Figure 20:
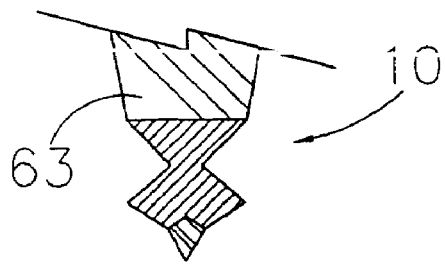
FIGS. 20 through 24 depict partial, cross-sectional views of alternative embodiments of the steering keel bar of FIG. 19 with the top surface of the keel bar having a shape that at least partially mates with and/or conforms to the undersurface of the vehicular snow ski keel.
Figure 21:
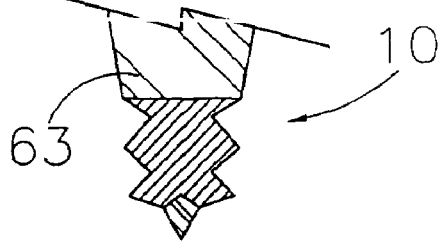
Figure 22:
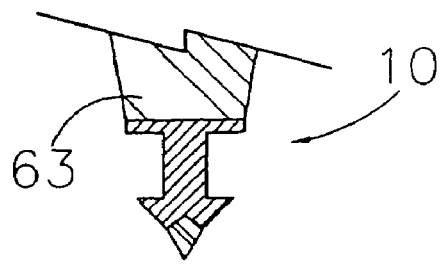
Figure 23:
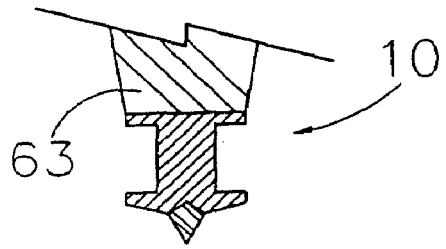
Figure 24:
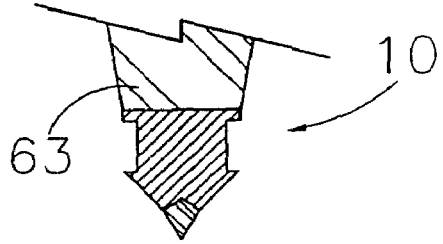
Figures 31, 32, 33:
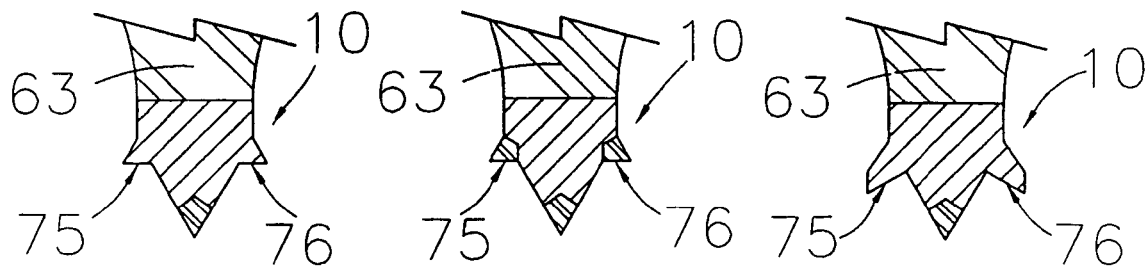
Figure 34:
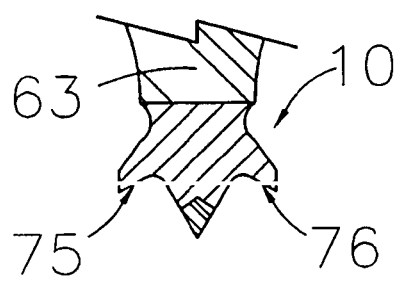
Figure 35:
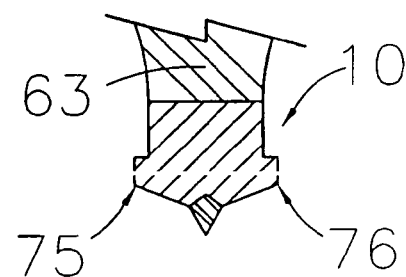
Figure 36:
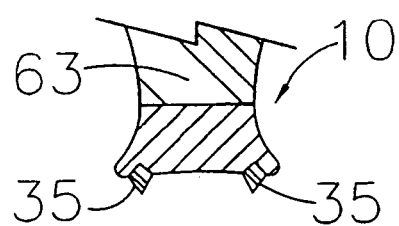
Figure 37:
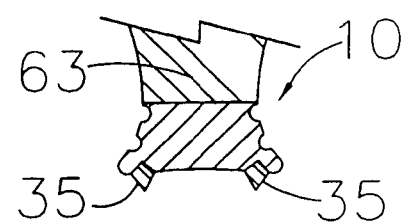
Figure 38:
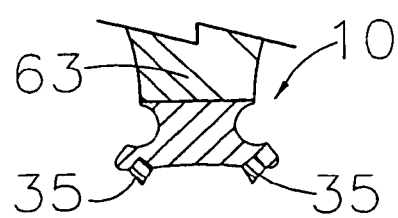
Figure 39:
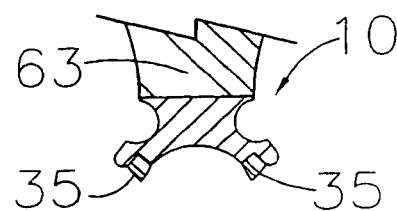

FIG. 19 depicts a cross-sectional view of an alternative embodiment of the steering keel bar 10 of the present invention that is attached to undersurface 62 and keel 63 of snowmobile ski 61. As previously described, first or lower side surface portion 11 of first or lateral side surface 23 of the keel bar directs snow into recessed, concave surface 13. First side surface 23 also includes second or upper side surface portion 12 of which the lower and upper portions extend out to first and second lateral extensions 39 and 40, respectively. Second side surface 25 is similar to first side surface 23 but for turning the bar and ski in an opposite direction. Steering keel bar 10 also includes top surface 36 that at least partially matches and/or conforms to undersurface 62 of keel 63. In this embodiment, shape 72 of the top bar surface 36 is approximately flat and at least partially matches and/or conforms to shape 74 of undersurface 62 of keel 63. Furthermore, the upper lateral extensions 40 and 42 of the bar approximate the lower lateral extensions or width of the undersurface 62 of keel 63. Thus, the bar operates as an extension of the keel and at least cooperates with the shape of the keel to compact and/or direct snow that comes in contact therewith. In addition, carbide insert 35 can be attached to bottom surface 34 as desired for added penetration in ice or snow. The width or distance 47 between lower lateral extensions 39 and 41 can be the same, more or less than the width or distance 48 between upper lateral extensions 40 and 42; however, both are normally greater than waist width or distance 49 for the purpose of compacting or directing snow and/or other material in recessed portions 13 and 27.

The width or distance 48 of upper lateral extensions 40 and 42 in this embodiment is selected to match or equal the width or distance of the undersurface 62 of keel 63. This is done to further extend the effects of the keel to cooperate with the contour of the steering bar to better compact and/or direct snow coming in contact therewith. In addition, any of the previously or subsequently described embodiments of the steering keel bars can be attached to the undersurface of a ski keel with the widths of the keel undersurface and bar top surface approximating each other to advantageously provide added cooperation between the steering bar and keel for added or desired material compaction or direction. This width approximation can also be applied to any cross-sectional steering bar configuration described herein or any cross-sectional configuration contemplated by one ordinarily skilled in the art.

FIGS. 20 through 24 depict partial, cross-sectional views of alternative embodiments of the steering keel bar 10 of the present invention that has a top surface 36 with a shape 72 that at least partially mates with and/or conforms to shape 74 of keel undersurface 62. In these embodiments, lateral extensions 40 and 42 of the upper width or distance 48 at top surface 36 approximates the lateral extensions of the lower width or distance of undersurface 62 of keel 63.

FIG. 25 depicts a cross-sectional view of yet another embodiment of the steering keel bar 10 of the present invention that is attached to snow ski 61 and, in particular, keel 63 having a curved lateral surface 73. This curved or radiused lateral keel surface is designed to direct and/or compact snow and/or other material as described in U.S. Pat. No. 5,145,201, which is incorporated by reference in its entirety. The curved keel surface and the side surface of the steering bar are designed to cooperate to further direct and/or compact snow and other material to improve the steering and handling characteristics of the snow ski. Preferably, upper lateral extensions 40 and 42 at top surface 36 approximate the lower lateral extensions of the undersurface 62 of the keel.

FIGS. 26 through 30 depict partial, cross-sectional views of still other alternative embodiments of the steering keel bar 10 of the present invention attached to the keel 63 of a snow ski similar to that depicted in FIG. 25. In these embodiments, the side surfaces are configured to cooperate with the lateral surface of the keel. These embodiments as well as FIG. 25 include one carbide insert 35 at the bottom or undersurface of the steering bar.

FIGS. 31 through 35 depict partial, cross-sectional views of yet other alternative embodiments of the steering keel bar 10 of the present invention attached to ski keel 63. Here, multiple lateral points 75 and 76 are included in the side surfaces of the bar for making contact with material such as ice during cornering and, in particular, hard cornering when the ski pivots laterally downward.

FIGS. 36 through 42 depict cross-sectional views of still yet other alternative embodiments of the steering keel bar 10 of the present invention attached to the undersurface of ski keel 63. In these embodiments, the undersurface of the steering bar includes multiple carbide inserts or points 35 for penetrating or contacting material such as ice.

FIGS. 43 through 47 depict cross-sectional views of yet still other alternative embodiments of the steering keel bar 10 of the present invention attached to a ski keel 63. Here, the contact point such as insert 35 is offset to one side of the steering keel bar with two different side surface configurations. This steering bar has different steering or handling characteristics when turning left or right. A steering bar with a mirror image cross-sectional shape can be used on the snow ski when a pair is, for example, mounted on a snowmobile. The same offset steering keel bar shapes can also be used on a pair of skis when the snowmobile or vehicle is being used on a track turning in only a clockwise or counterclockwise direction.

Figure 48:
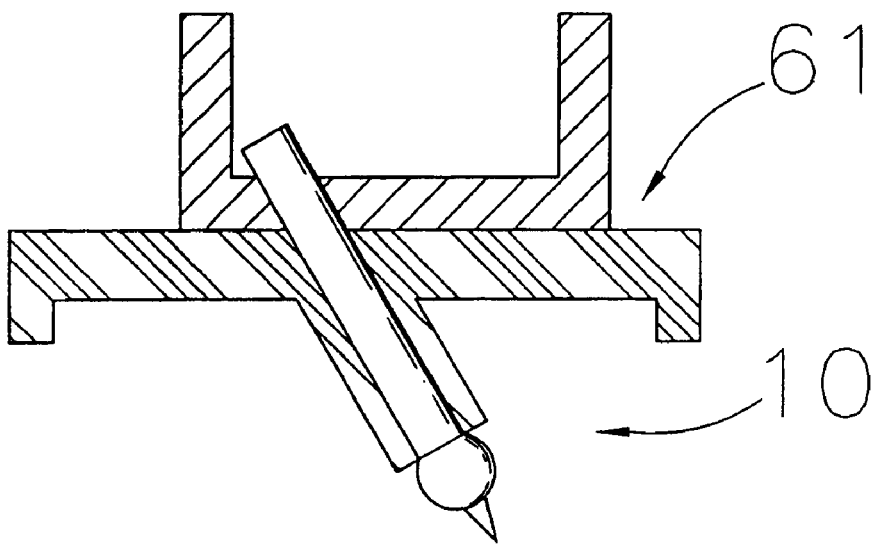
FIG. 48 depicts a cross-sectional view of alternative embodiments of a snow ski with a keel angled toward one lateral side.
Figure 49:
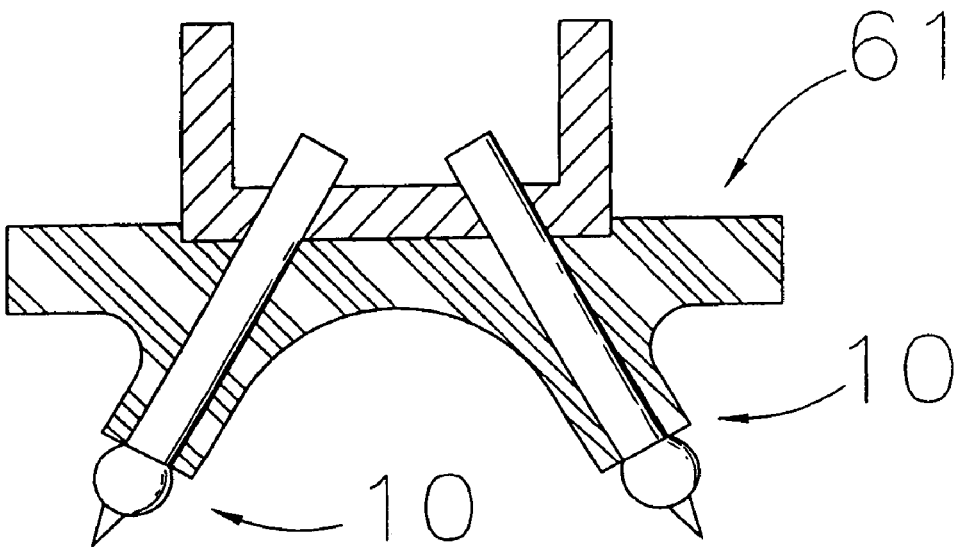
FIG. 49 depicts a cross-sectional view of an another alternative embodiment of a snow ski with multiple keels angled to different lateral sides.
Figure 56:
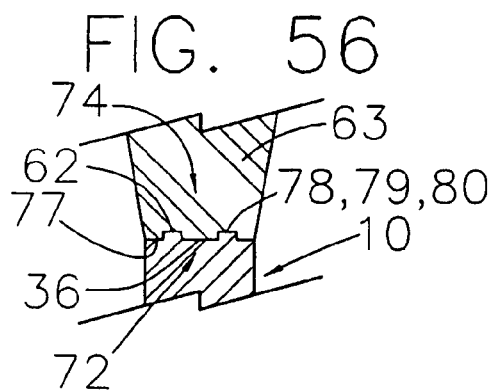
Figure 57:
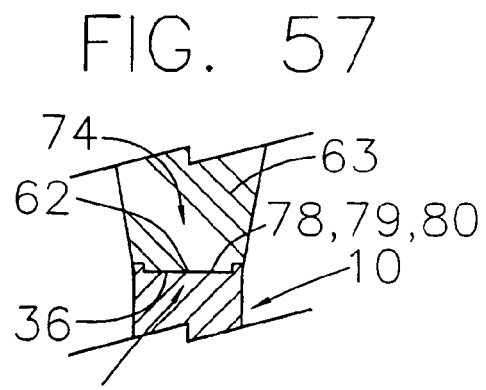
Figure 58:
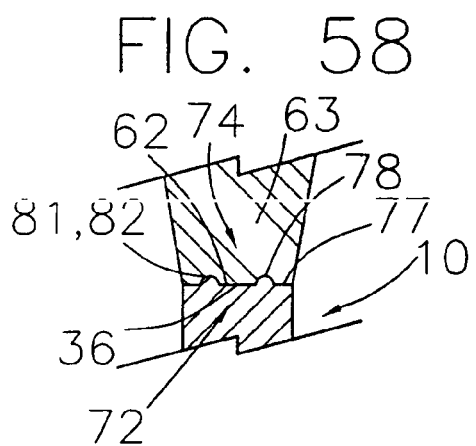
Figure 59:
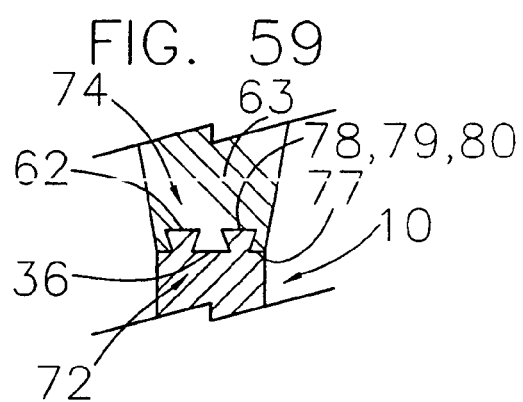
Figure 60:
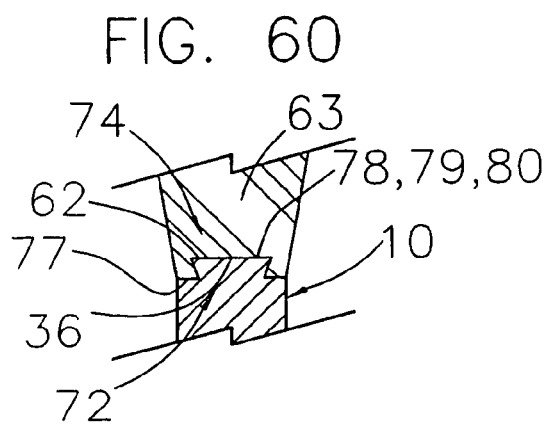
Figure 61:
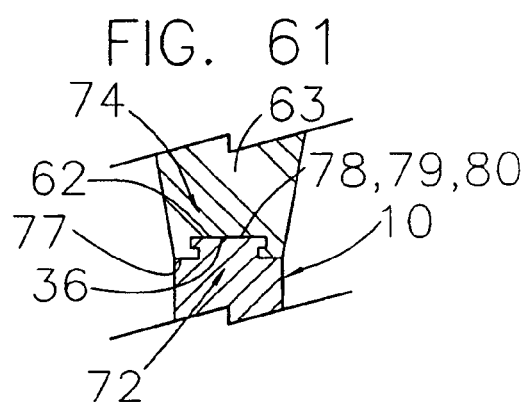

FIGS. 48 and 49 depict cross-sectional views of the steering keel bar 10 of the present invention in combination with a snow ski 61 that has a single or multiple keels 63 angled to one or more different sides of the snow ski.

FIGS. 50 through 66 depict partial, cross-sectional views of the steering keel bar 10 of the present invention attached to the keel 63 of a snow ski. The shape 72 of the top surface 36 of the steering bar at least partially mates with and/or conforms the shape 74 of the undersurface 62 of the keel 63 and includes at least one or more of a flat 77, recess 78, notch 79, key 80, curve 81, radius 82, ridge 83 surface and/or any combination of the surfaces that at least partially mates and/or interlocks with the undersurface of the keel. A saw tooth shape for the top surface is also contemplated. Advantageously, this improves or better secures the attachment of the steering bar to the keel and/or lessens or eliminates the need for attachment studs.

It is to be understood that the above described vehicular snow ski steering keel bar is merely an illustrative embodiment of the principles of this invention and that numerous other steering keel bar configurations based on those depicted herein may be devised by those skilled in the art without departing from the spirit and scope of the invention. In particular, the various cross-sectional shapes of the steering keel bar described herein can be varied along the length of the bar to provide fine-tuning of the turning characteristics of a particular vehicular ski and the vehicle to which they are attached.

What is claimed is:

1. A vehicular snow ski steering keel bar comprising:
   a side surface including first and second side surface portions extending to first and second lateral extensions of said bar, respectively, and extending longitudinally at least partially along said bar, said side surface also including a recessed surface portion disposed between and recessed in from each of said first and second lateral extensions, wherein at least one of said first and second lateral extensions projects laterally outward more than an other of said first and second lateral extensions; and
   a top surface having a shape that at least partially mates and/or conforms with a shape of an undersurface of a vehicular snow ski keel.

2. The vehicular snow ski steering keel bar of claim 1, wherein said shape of said top surface has a width that matches a width of the undersurface of the vehicular snow ski keel.

3. The vehicular snow ski steering keel bar of claim 1, wherein said shape of said top surface includes at least one of a flat, recess, notch, saw tooth, key, curve, radius, ridge and any combination thereof that at least partially mates with the undersurface of a vehicular snow ski keel.

4. The vehicular snow ski steering keel bar of claim 1, wherein said recessed surface portion in cooperation with a lateral surface of the vehicular snow ski keel alters the compacting of snow coming in contact therewith.

5. A vehicular snow ski steering keel bar comprising:
   an elongated member having a front end, a back end and an intermediate portion extending longitudinally between said ends, said intermediate portion having a first side surface extending longitudinally at least partially therealong and facing in an at least first lateral direction therefrom; said first side surface having a recessed surface portion extending longitudinally at least partially therealong and a first side surface portion below and extending outwardly in said at least first lateral direction from said recessed surface portion to a first lateral extension, wherein said intermediate portion further has a second side surface extending longitudinally at least partially therealong and facing in an at least second lateral direction opposite said at least first lateral direction, said second side surface having another recessed surface portion extending longitudinally at least partially therealong and an other first side portion below and extending outwardly in said at least second direction from said other recessed surface portion to an other first lateral extension; and
   a top surface having a shape that at least mates and/or conforms to an undersurface of ski keel, whereby said lateral recessed surface portion and said first side surface portion cooperate for at least collecting and/or compacting snow and/or other material coming in proximity to at least one of said recessed surface portion and said first side surface portion.

6. The vehicular snow ski steering keel bar of claim 5, wherein said first side surface has a second side surface portion above and extending outwardly in said at least first lateral direction from said recessed surface portion to a second lateral extension.

7. The vehicular snow ski steering keel bar of claim 5, wherein said intermediate portion has a transverse cross-sectional shape in which a width extending transversely thereacross and from said recessed surface portion is less than a first width extending transversely thereacross and from said first side surface portion.

8. A vehicular snow ski steering keel bar of claim 5, wherein said recessed surface portion includes a concave surface portion.

9. The vehicular snow ski steering keel bar of claim 5, wherein said first side surface portion includes a convex surface portion.

10. The vehicular snow ski steering keel bar of claim 5, wherein said intermediate portion includes a bottom surface and at least one insert of a material harder than that of said intermediate portion and affixed to said bottom surface.

11. The vehicular snow ski steering keel bar comprising:
    an elongated member extending longitudinally and having a front end, a back end and an intermediate portion extending longitudinally between said ends, said intermediate portion having a first side surface and a second side surface each extending longitudinally at least partially therealong, said first side surface facing in an at least first lateral direction therefrom, said second side surface facing in an at least second lateral direction opposite said at least first lateral direction, at least one of said first and second side surfaces having a recessed surface portion extending longitudinally at least partially therealong and a first side surface portion below and extending outwardly from said recessed surface portion, wherein said first side surface includes said recessed surface portion and said first side surface portion below and extending outwardly from said recessed surface portion and wherein said second side surface includes an other recessed surface portion extending longitudinally at least partially therealong and an other first side surface portion below and extending outwardly from said other recessed surface portion; and a top surface that at least partially mates and/or conforms to an undersurface of a ski keel, whereby said recessed surface portion and said first side surface portion cooperate for at least collecting and/or compacting snow and/or other material coming in proximity to at least one of said recessed surface portion and said first side surface portion.

* * * * *